United States Patent
Zimmer et al.

(10) Patent No.: US 7,162,629 B2
(45) Date of Patent: Jan. 9, 2007

(54) METHOD TO SUSPEND-AND-RESUME ACROSS VARIOUS OPERATIONAL ENVIRONMENT CONTEXTS

(75) Inventors: Vincent J. Zimmer, Federal Way, WA (US); Michael A. Rothman, Olympia, WA (US); Mark S. Doran, Olympia, WA (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 10/719,788

(22) Filed: Nov. 20, 2003

(65) Prior Publication Data

US 2005/0114645 A1    May 26, 2005

(51) Int. Cl.
*G06F 15/177* (2006.01)
(52) U.S. Cl. .......................................... 713/100; 713/1
(58) Field of Classification Search .................. 713/1, 713/100
See application file for complete search history.

(56) References Cited

U.S. PATENT DOCUMENTS

| | | | | |
|---|---|---|---|---|
| 5,715,464 | A * | 2/1998 | Crump et al. | 713/323 |
| 6,081,752 | A * | 6/2000 | Benson et al. | 700/79 |
| 6,385,721 | B1 * | 5/2002 | Puckette | 713/2 |
| 6,434,696 | B1 * | 8/2002 | Kang | 713/2 |
| 6,678,712 | B1 * | 1/2004 | McLaren et al. | 718/100 |
| 6,957,286 | B1 * | 10/2005 | Cohen | 710/38 |
| 2004/0078636 | A1 * | 4/2004 | Suzaki | 714/6 |
| 2004/0236974 | A1 * | 11/2004 | Brown et al. | 713/320 |

FOREIGN PATENT DOCUMENTS

EP        0658843 A1 *   6/1995

* cited by examiner

*Primary Examiner*—Chun Cao
(74) *Attorney, Agent, or Firm*—Joni D. Stutman-Horn (57) ABSTRACT

A method to Suspend-and-Resume across various operational environment contexts is disclosed. An environmental context is saved in a disk partition corresponding to the saved environment. The system is suspended. Upon resume, a selected environmental context is selected for boot or resume. This method of switching contexts may also be used for trusted execution, manageability, and other purposes.

27 Claims, 4 Drawing Sheets

METHOD TO SUSPEND-AND-RESUME ACROSS VARIOUS OPERATIONAL ENVIRONMENT CONTEXTS

FIELD OF THE INVENTION

An embodiment of the present invention relates generally to computing devices and, more specifically, to a method to suspend and resume a computing device across various operational environment contexts for trusted execution, manageability, and other purposes.

BACKGROUND INFORMATION

Various mechanisms exist for saving power by suspending computer execution and for implementing a multi-boot computing device. In systems of the prior art, a single operating system (OS) is typically booted at a time. If a second OS is needed, the computing device must be powered down and the firmware rebooted. Typically, there are standards governing the boot process such as the basic input/output system (BIOS) boot specification or the extensible firmware interface (EFI) boot manager. The user chooses which OS to boot. One scenario for requiring multi-boot machines might be in the case where a user uses an application running on Linux to surf the world wide web, but must use an application running on Microsoft® Windows™ to retrieve corporate e-mail. Switching between the two OSs requires a significant amount of time; one incurs the costs of rebooting the entire machine. On a desktop computer it might take 8-9 seconds to reboot the firmware, but on a server it may take up to two minutes to reboot the firmware. Further, after reacquiring and initializing the hardware devices, the OS needs to be loaded and started up, as well.

A single OS environment typically has power requirements, i.e., meeting U.S. EnergyStar ratings. An exemplary requirement might be for the machine to only dissipate 100 Watts. The Advanced Configuration & Power Interface (ACPI, see http://www.acpi.info) is an industry specification jointly developed by Intel Corporation, Microsoft Corporation, Toshiba Corporation and Hewlett-Packard Company to identify standards for managing power. Sleep states and transitions are defined in the ACPI specification. For instance, there is an ACPI specification that defines how to build hardware to support an S4 sleep state. Hibernate (S4) is used to save power—deep sleep. In order to hibernate into S4, the OS takes all of its memory contents and saves them to a disk file. This contrasts with a Standby (S3) state, where contents of memory are retained. A small amount of power is provided to the system random access memory (RAM) and the chipset to catch or listen for a wake event, for instance the lid of a laptop opening. In state S4, everything is powered off.

In state S4, when returning from Hibernate, the system does not need to rediscover the hardware installed in the system or reload all of the device drivers and discover the platform state. The OS initial loader realizes this is an S4 resume and asks the firmware to help it load the disk file back into memory. Memory holds a snapshot of the system and this snapshot is restored upon the resume.

A possible scenario for hibernation follows. A user is in a meeting in a conference room with a computer powered on and booted up. The user requests Hibernate mode, closes the laptop lid and go back to an office. All contexts of current operation are saved, including the machine context. Once back in the office, the user opens the lid and resumes. A 128 MB file, for instance, is then loaded from hard drive to memory. If the OS changed the hardware state from the time of the original boot up, for instance, modification of an IO port state, then this modified context is retrieved during the resume. Microsoft® Windows™ uses suspend, hibernation and resume modes extensively. However, at present, there is no way to resume from a hibernation mode in one OS to a resume into a different OS. A reboot process is required to change operating system environments.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to resuming from hibernation of one operational environment into a distinctly different operational environment. In at least one embodiment, the present invention is intended to allow a user to select which operational environment to resume to when resuming from a hibernate (S4) state.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

A system and method to overload hibernate methodology is described. Before hibernation, or as part of hibernation, a policy mechanism allows a user to determine which environment to resume to. Specifically, a multi-tenant environment, i.e., a system supporting multiple OSs (i.e., with two partitions, for instance, one for Linux and one for Windows™), may have a policy to determine whether to resume to Windows™ or Linux. In one embodiment, selection of the policy may be effected by depressing a physical button on the computing device. One button might indicate a resume Linux and the other might indicate a resume to Windows™. It will be apparent to one of ordinary skill in the art that a policy requiring physical user interaction to select the OS may include pressing a button, toggle, switch, or otherwise physically interrupting an electrical, optical or other circuit. If the computing device was not in hibernation at the time of selection, then one scenario may be that the selected OS associated with the button is booted. If the computing device is in hibernation, then the button identifies which OS's S4 save state file to resume from.

In systems of the prior art, the virtual machine model allows a user to switch OS contexts using an X-terminal. For instance, to communicate with a machine running the UNIX operating system, one might use a virtual machine model, so that Linux is running inside of Windows™ OS or Windows™ is running inside of a Linux OS. Virtual machine monitors support multiple OSs or a terminal program to communicate with another machine. However, not all computing devices support virtual machines. Further, virtual machines have limitations, for instance, a number of allowable partitions.

Using an extensible firmware interface (EFI) compatible system, partition tables make it easy to share large disks. Almost an unlimited number of partitions are available.

Figure 1:
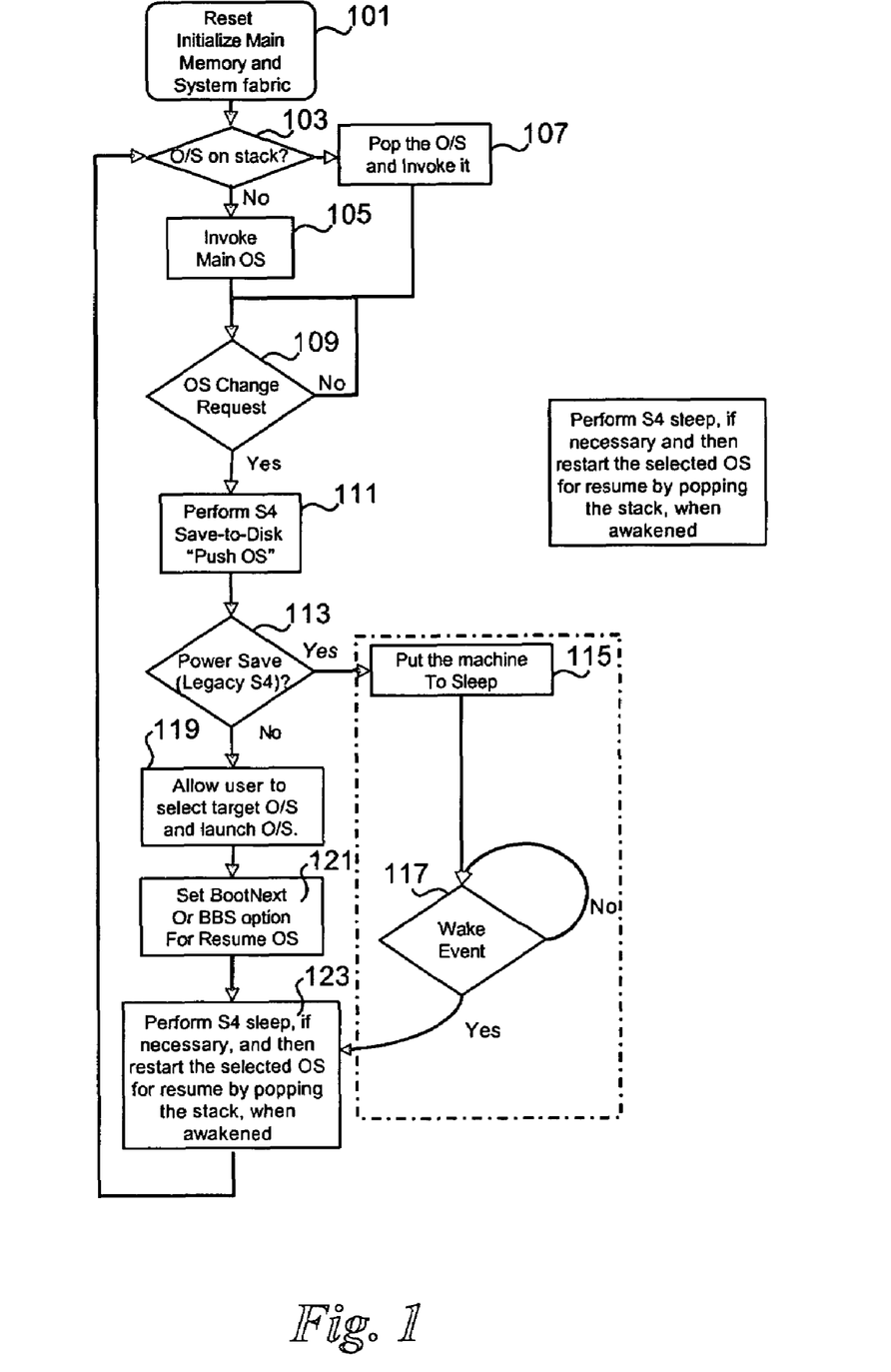
FIG. 1 is a flow diagram of an exemplary method for resuming from one operational context to another.

Referring now to the drawings, and in particular to FIG. 1, there is shown an exemplary method for resuming from one operational context to another. A user reboots or resumes the computer. The main memory and system fabric is reset and initialized in block 101. A policy has been determined for the computer which defines how an OS is selected. As described above, a physical button may be pressed or a message may be selected from a prompt. The policy mechanism is defined so the loader can select to which OS to resume. An operational context is determined based on the policy. It is determined whether the selected OS is on the stack of hibernated OSs in block 103. If the OS has been hibernated, the pointer to the saved context is popped from the stack and the OS is invoked in block 107. If the selected OS has not been hibernated, then the selected OS is booted as usual.

In one embodiment, a user may select an alternate operating context before hibernating. This selection may be from a pull down menu, or by pressing a button, or another selection method. It is determined whether the user wishes to change operational environments, or operating systems in block 109. This determination may be made by an interrupt service routine or other process. The process may sleep until called, or may poll for a new selection and then return if no OS change request is received. If an OS change request is indicated, then the OS may be forced into hibernation (S4 state) in block 111. When entering hibernation mode, the processing system saves memory and system context to a predetermined location. In one embodiment, a pointer to the OS save file is pushed onto a stack.

In one embodiment, a determination is made as to whether the computing device should be put in sleep mode or whether additional user input data is required (block 113). If no user input is required, the computing device may be put to sleep in block 115 until a wake event is detected in block 117. In some embodiments, an OS change request puts the computing device to sleep, but an immediate wake event is scheduled to awaken the computing device to the alternative environment. If further user input is required, i.e., the computing device is not put to sleep, the user may be allowed to select a target environment, or OS, to be launched in block 119. In some embodiments, the user may select an environment for the next boot or resume operation, i.e., setting a bootnext variable, in block 121. If this policy is implemented, a user can select to which OS the computing device is resumed or booted after the next sleep or shutdown, respectively. In some embodiments, after setting the bootnext variable, the system is put into sleep mode immediately prior to being awakened (block 123), e.g., sleep mode is used as a method to switch OSs, not to stay asleep. When the computing device is awakened from sleep mode, or hibernate mode, or restarted, the selected operational context is retrieved and the stack of hibernated OSs is "popped" in block 123.

Figure 2:
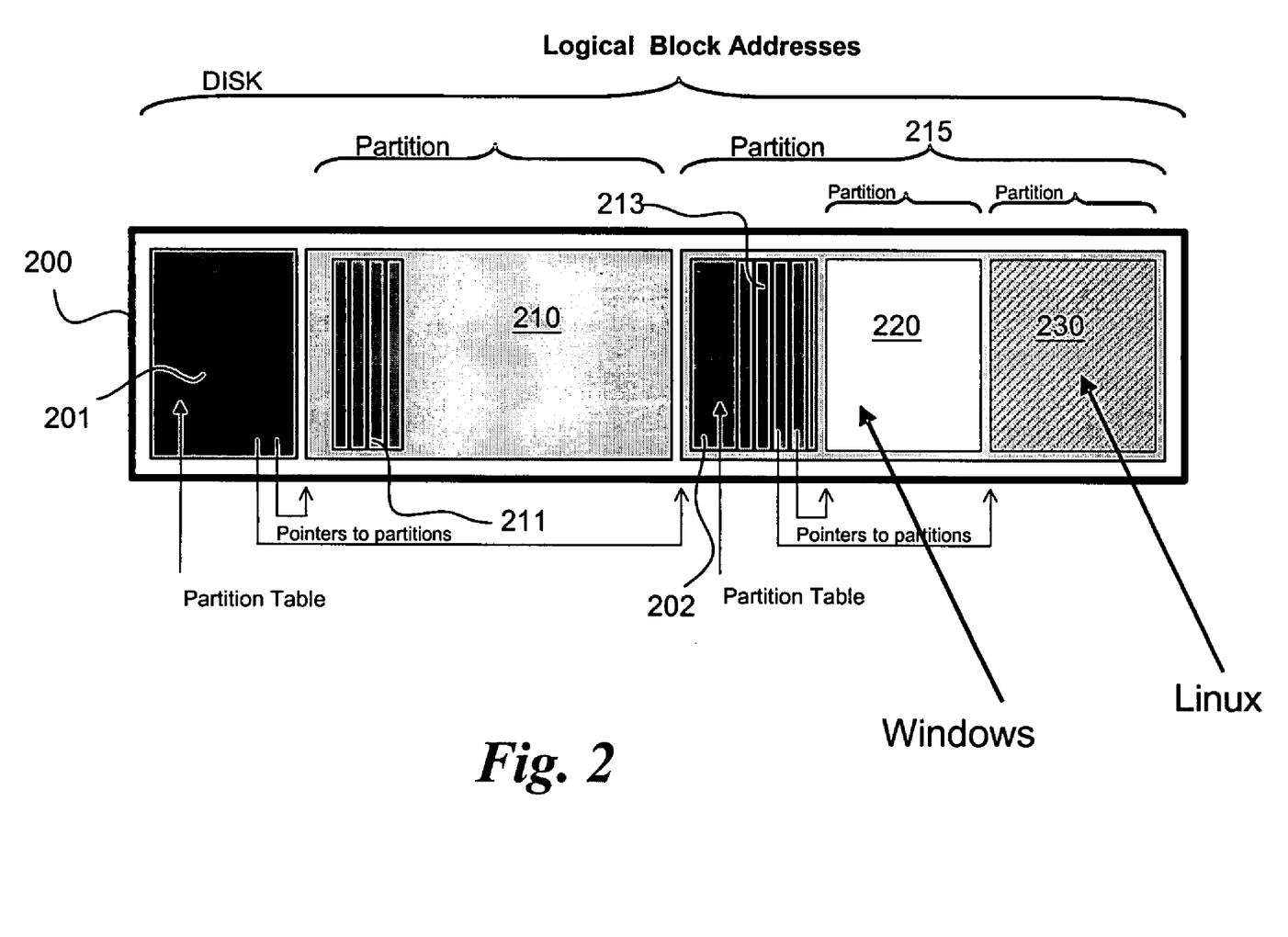
FIG. 2 is a block diagram representing disk partitions such as could be used for a system and method as disclosed herein.

Referring now to FIG. 2, there is shown a block diagram representing disk partitions such as could be used for a system and method as disclosed herein. A disk 200 has multiple partitions 210, 220 and 230. In one embodiment, there is one partition for each OS. A partition table 201 identifies partitions 210 and 215 on the disk. In an embodiment, a partition 215 has sub-partitions 220 and 230 and corresponding partition table 202. Each OS saves its memory image file to its own partition. In one embodiment the partition table uses globally unique identifiers (GUIDs) to identify the partitions. This is called a GUID'ed partition table (GPT), as described in the EFI 1.10 Specification which may be found at http://www.intel.com/technology/efi. Each small slice 211 and 213 in a GPT is a GUID-pointer pair. The slices 211, 213 are tables of partition entries. EFI specification discusses GPTs. The pointers have a GUID associated with them. The GUID may designate, for instance, Linux, and point to the EXT2, a Linux file system partition. The next GUID may designate Windows™ and point to an NTFS, a Windows™ file system partition. The next GUID may be a manageability partition with a proprietary GUID id. It will be apparent to one skilled in the art that there could be a X86 Solaris partition, or any other OS partition, in addition to those specifically described in the examples herein.

There may also be an EFI system partition; in one embodiment, this may be the only shared resource partition. The OS loaders may be stored in the EFI partition. The memory image file for a resume may not be stored in the EFI system partition. However, the OS loaders may be stored in the EFI system partition.

Specifically, when the system is transferred between Linux, Windows™, and Firmware execution environments, each "resumed OS" has its own partition. Using an EFI compatible system allows any partition to be used as the primary partition for an OS. Further, there is no artificial limitation of four partitions. Current systems are typically limited to four OS partitions because of legacy master boot record (MBR) limitations, and they do not share file systems. In the system described herein, there is a list of GUID'ed partitions in the GPT. Each OS instance may have its own partition, thus avoiding corruption wherein two OSs would try to share a given file-system, etc. as they are time-multiplexed.

Figure 3:
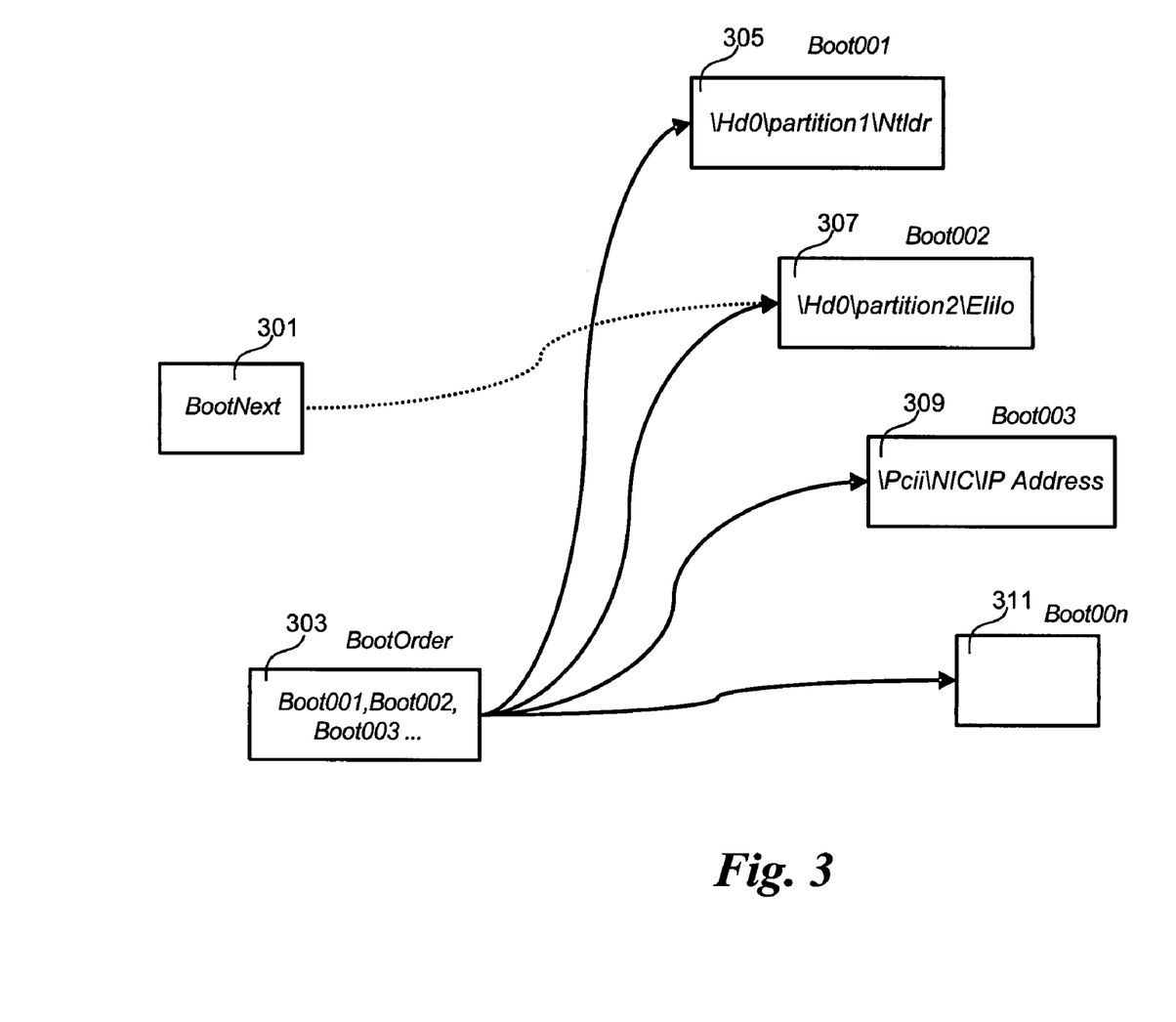
FIG. 3 is a block diagram representing the use of the bootnext variable in an exemplary system.

The "restart into OS" block 123 in FIG. 1 may involve calling a given OS loader type from the EFI system partition, and each loader may choose the correct partition from the plurality of available ones (e.g., NTFS for Windows™ (305), EXT2 for Linux (307), FAT32 for EFI, etc).

In one embodiment of the present system and method, resuming from the S4 state is preferable to resuming from S3, i.e., hibernate over standby. S3 resumes faster, but it requires more power. S4 is a better choice for power saving. Present systems cannot share memory, so resuming from S3 to another operating system is not currently feasible.

In some embodiments, the target computing device is a server, for instance in an enterprise. In this case, the OS may not be changed for routine operational reasons, but an alternative operational environment may be required for diagnostics, maintenance, manageability, and control purposes, for example.

In one embodiment, at time 0, for EFI, the first boot of the machine, EFI has EFI system variables stored in a flash memory. These variables are binary entities that are stored in non-volatile memory. EFI system variables are documented in the EFI specification. One aspect of EFI system variables is that the EFI system variables have policy directives, a subset of which identify which OS to boot. These variables are called "bootnext" variables. The bootnext variable identifies a location of where the boot loader is for the operating system to be booted.

Referring to FIG. 3, there is shown a block diagram, representing the use of the bootnext variable in an exemplary system. The bootnext variable 301 points to a boot block pointer 307. In this example, a bootorder 303 identifies n boot blocks: boot001, boot002, boot003 and boot00n. Bootorder 303 points to each boot block boot001 305, boot002 307, boot003 309 and boot00n 311. In this example, boot block boot002 307 will be the next OS loaded (booted or resumed to) in the system.

In an embodiment of a multi-boot environment of Windows™ and Linux, a laptop nay be configured with an EFI-aware OS. In this example, there are two GUID'ed partition table entries, one for Linux and one for Windows™. Thus, there would be two boot options: one boot option pointed to efi linux loader (ELILO) boot002 307, and one to NTLoader.efi boot001 305. Upon first boot, if Windows™ is the chosen OS, the NT loader gets loaded from firmware. NTloader.efi loads the Windows™ kernel, the Windows™ partition and the loader knows how to ascertain contents of this file system partition. The NT loader then loads the OS. A prompt after resume, for example in a firmware setup screen, might prompt the user: "You have hibernated. Do you want to resume Windows™, or boot Linux?" The system may keep n boot options and each boot option points to a different OS loader. BootNext 301 points to the active version of the loader. If Windows™ was last to be hibernated, possible options given might be: "Resume Windows™, cold boot Windows™, boot Linux, or resume Linux". Each time the system comes out of hibernation there may be a button to push on system or an F-key to press which causes the transfer of control to a firmware routine to make a manual choice to tell firmware to change the value of bootnext. In an embodiment, the OS loader is the process which actually restores the memory file from its respective partition.

In one embodiment, the firmware reacts to a button push or user selection to be told on a resume event which OS loader to resume to. A manageability environment has its own partition and its own OS loader. The OS loader is an EFI application to which control is passed as part of the boot process. The only policy directive managed by firmware may be selecting which of loaders to use. The S4 resume model, including switching of operational contexts, operates the same regardless of whether it received the selection from an out-of-band hardware signal or a pop-up console, or a policy is built into firmware to choose a different boot00n for booting. The bootnext variable is used in this embodiment to indicate to which environment the system should resume. In another embodiment, a regularly scheduled event might be set, such as, every October 3 resume the system to the boot007 option. Buttons, lift lid, or other various policies may be used to identify which OS to boot or resume to, but the policy selection may be effectuated using the bootnext variable.

Upon entering a sleep or hibernate mode, all of system memory is transformed by reading the memory and saving the memory to the hard disk. OS loaders need file system awareness because they load the OS from a file system on a partition. Instead of just loading the OS, a loader will load a file name, for instance, memory-contents.0 or another such resume save file having the environment's context embedded. This may be loaded before the kernel.

Figure 4:
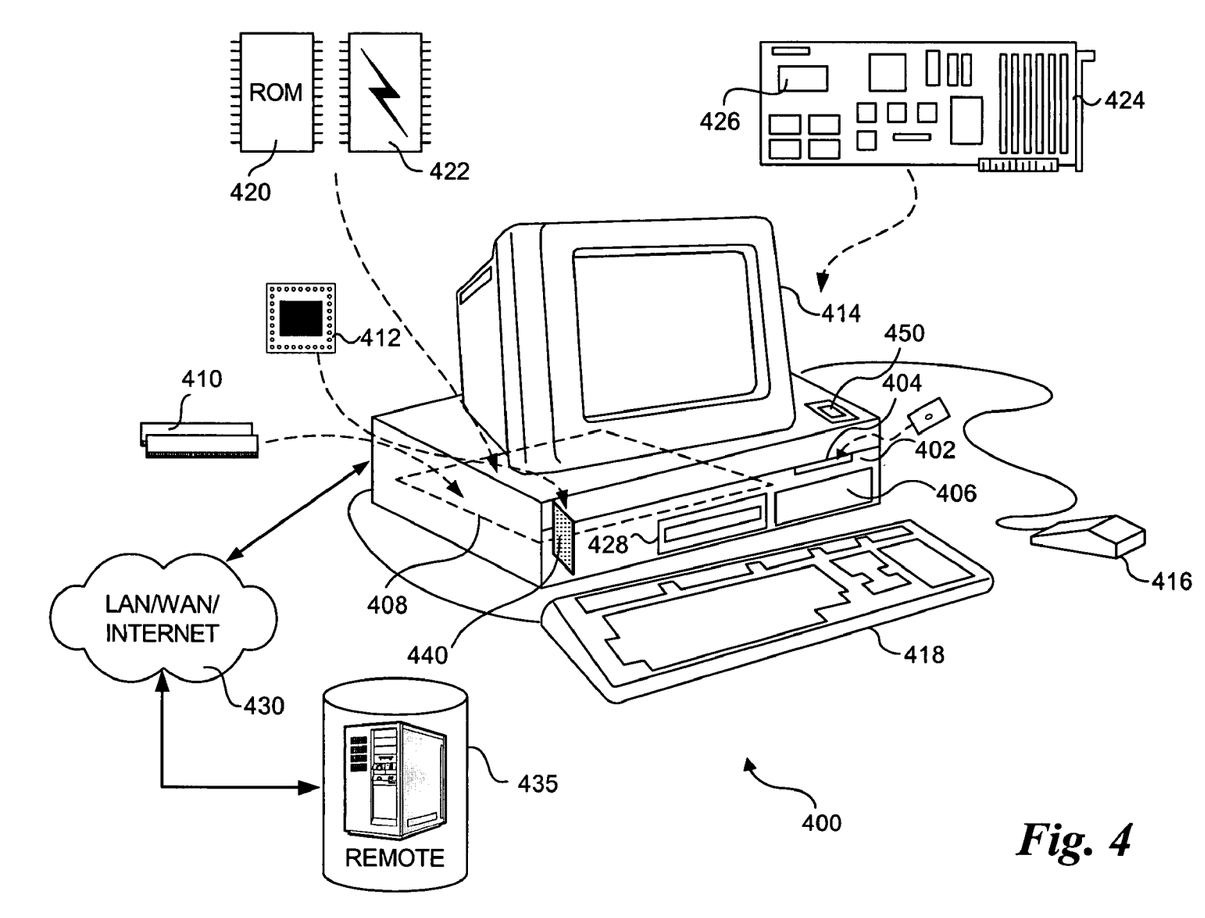
FIG. 4 illustrates an embodiment of an exemplary computer system for practicing an embodiment of the system and method as described herein.

FIG. 4 illustrates an embodiment of an exemplary computer system 400 for practicing an embodiment of the system and method, as described above. Computer system 400 is generally illustrative of various types of computer devices, including any computational device known in the art, such as a personal computer, a workstation, a server, a mainframe, a hand held computer, a palm top computer, personal digital assistant (PDA), a telephony device, a network appliance, a convergence device, etc. For simplicity, only the basic components of the computer system are discussed herein. Computer system 400 includes a processor chassis 402, which houses various hardware components, including a floppy disk drive 404, a hard disk 406, a power supply (not shown), and a motherboard 408. The motherboard is populated with appropriate integrated circuits, including system memory 410 coupled to one or more processors 412. System memory 410 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or similar component. Processor 412 may be a conventional microprocessor including, but not limited to, an Intel Corporation x86, Pentium, or Itanium family microprocessor, a Motorola family microprocessor, or similar component. Hard disk 406 may comprise a single unit, or multiple units, and may optionally reside outside of computer system 400. The computer system 400 also includes a boot firmware device on which firmware is stored, which may typically comprise non-volatile memory such as a ROM device 420 or a flash device 422. Other non-volatile memory devices include, but are not limited to, an Erasable Programmable Read Only Memory (EPROM), an Electronically Erasable Programmable Read Only Memory (EEPROM), or similar. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 414 may be included for displaying graphics and text generated by firmware, software programs and program modules that are run by computer system 400, such as system information presented during system boot. A mouse 416 (or other pointing device) may be connected to a serial port, USB port, or other like bus port communicatively coupled to processor(s) 412. A keyboard 418 may be communicatively coupled to motherboard 408 in a similar manner as mouse 416 for user entry of text and commands. In one embodiment, computer system 400 also includes a network interface card NIC or built-in NIC interface 440 for connecting computer system 400 to a communication network 430, using any one of several types of data transmission media including, for example, twisted wire pair cabling, coaxial cabling or fiber optic cabling. Alternatively, the NIC 440 may be coupled to the communication network 430 by a wireless data link. However, these are merely examples of data transmission media that may be used to transmit data from a communication network to a NIC and embodiments of the present invention are not limited in these respects. In one embodiment network 430 is further coupled to a remote computational device 435, such that computer system 400 and remote computer 435 can communicate.

The illustrated embodiment further may include an optional add-in card 424 that is coupled to an expansion slot of motherboard 408. In one embodiment, add-in card 424 includes an option-ROM 426 on which firmware is stored. Computer system 400 may also optionally include a compact disk read only memory ("CD-ROM") drive 428 into which a CD ROM disk may be inserted so that executable files, such as an operating system, and data on the disk can be read or transferred into system RAM 410 and/or hard disk 406. Other mass memory storage devices may be included in computer system 400.

In one embodiment, computer system 400 has a switch or button 450 to effectuate a request to switch operational contexts. This selection mechanism may be connected to any surface of the computer system 400, or be external to the computer system and be operatively coupled via a wired or wireless connection (Not shown).

The techniques described herein are not limited to any particular hardware or software configuration; they may find applicability in any computing, consumer electronics, or processing environment. The techniques may be implemented in hardware, software, or a combination of the two. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for resuming a computing device, comprising:
    determining whether a selected operational environment is in a resume stack;
    if the selected operational environment is in the resume stack, then
        popping an entry of the resume stack, the entry identifying a location of a resume file;
        invoking the selected operational environment using the resume file; and
    booting the selected operational environment if the selected operational environment was not in the resume stack, wherein the resume stack identifies a plurality of disparate operational environments,
    wherein each operational environment has a corresponding disk partition, the corresponding disk partition having an operational environment loader, wherein the resume file resides in a disk partition identified by a globally unique identifier (GUID) in a partition table, the disk partition corresponding to one of a plurality of operational environments to be run on the computing device, and wherein the computing device is configured with an extensible firmware interface (EFI) architecture to define the plurality of disk partitions havina corresponding operational environments.

2. The method as recited in claim 1, further comprising:
    entering a sleep mode for a current operational environment, wherein entering the sleep mode causes the saving of a corresponding resume file and pushing of a location of the corresponding resume file onto the resume stack; and
    selecting a second operational environment to which a resume is desired.

3. The method as recited in claim 1, wherein the resume stack comprises pointers identifying which operational environments have been put into sleep mode.

4. The method as recited in claim 3, wherein an EFI bootnext variable identifies an operational environment to which to resume.

5. The method as recited in claim 4, wherein the bootnext variable identifies a location of a boot loader corresponding to the selected operational environment.

6. The method as recited in claim 1, further comprising:
    waking the computing device in response to a wake event, wherein the selected operational environment is invoked upon waking, and wherein the selected operational environment is resumed from the resume file, if the resume file was identified in an entry popped from the resume stack.

7. The method as recited in claim 1, wherein in an operating system loader for the selected operational environment resides in a system disk partition conforming to an extensible firmware interface (EFI) architecture.

8. The method as recited in claim 1, further comprising:
    selecting by a user the operational environment to resume, wherein the selecting is effected by utilizing a physical selection means, the selection means being chosen from the group of selection means consisting of a button, toggle, switch, and other physical circuit interruption devices.

9. A system for resuming an operational environment, comprising:
    a multi-boot capable processor coupled with system memory;

a storage unit having multiple partitions, wherein each selectable operational environment corresponds to a partition;

a first selector for determining a next boot location; and a resume selector, the resume selector to identify a selected operational environment, and to be selected from a plurality of operational environments to run on the processor, the resume selector to determine whether the selected operational environment is on a resume stack, to pop the resume stack to identify a location of a resume file, to invoke the selected operational environment from the resume file, and to boot the selected operational environment, wherein the resume stack identifies a plurality of disparate operational environments, wherein each operational environment has a corresponding disk partition, the corresponding disk partition having an operational environment loader, wherein the resume file resides in a disk partition identified by a globally unique identifier (GUID) in a partition table, the disk partition corresponding to one of the plurality of operational environments to be run on the processor, and wherein the processor is configured with an extensible firmware interface (EFI) architecture to define the plurality of disk partitions having corresponding operational environments.

10. The system as recited in claim 9, wherein the first selector comprises an EFI bootnext variable pointing to one of a plurality of boot blocks, each of the plurality of boot blocks identifying a location for a boot loader.

11. The system as recited in claim 9, wherein entering a sleep mode for a current operational environment saves a corresponding resume file and pushes a location of the corresponding resume file to the resume stack, and wherein the resume selector resumes the system to a second operational environment to which a resume is desired.

12. The system as recited in claim 9, wherein the resume stack comprises pointers identifying which operational environments have been put into sleep mode.

13. The system as recited in claim 10, wherein a bootnext variable identifies an operational environment to which to resume.

14. The system as recited in claim 13, wherein the bootnext variable identifies a location of a boot loader corresponding to the selected operational environment.

15. The system as recited in claim 9, wherein the resume selector wakes the processor in response to a wake event, wherein the selected operational environment is invoked upon waking, and wherein the selected operational environment is resumed from a resume file, if the resume file was identified on the resume stack.

16. The system as recited in claim 9, further comprising:
a physical selection means to be operated on by a user in order to choose the selected operational environment to be resumed, wherein the physical selection means is chosen from the group of selection means consisting of a button, toggle, switch, and other physical circuit interruption devices.

17. An article of manufacture comprising a machine accessible medium having instructions that, when executed, cause a machine to:
determine whether a selected operational environment is in a resume stack;
if so, then pop an entry from the resume stack to identify a location of a resume file;
invoke the selected operational environment from the resume file, if identified; and
boot the selected operational environment, if the selected operational environment was not on the resume stack, wherein the resume stack identifies a plurality of disparate operational environments, wherein each operational environment has a corresponding disk partition, the corresponding disk partition having an operational environment loader, wherein the resume file resides in a disk partition identified by a globally unique identifier (GUID) in a partition table, the disk partition corresponding to one of the plurality of operational environments to be run on the processor, and wherein the processor is configured with an extensible firmware interface (EFI) architecture to define the plurality of disk partitions having corresponding operational environments.

18. The article as recited in claim 17, further comprising instructions that:
enter a sleep mode for a current operational environment, wherein entering the sleep mode causes the saving of a corresponding resume file and pushes a location of the corresponding resume file onto the resume stack; and
select a second operational environment to which a resume is desired.

19. The article as recited in claim 17, wherein the resume stack comprises pointers identifying which operational environments have been put into sleep mode.

20. The article as recited in claim 19, wherein a bootnext variable identifies an operational environment to which to resume.

21. The article as recited in claim 20, wherein the bootnext variable identifies a location of a boot loader corresponding to the selected operational environment.

22. The article as recited in claim 17, further comprising instructions that:
wake the computing device in response to a wake event, wherein the selected operational environment is invoked upon waking, and wherein the selected operational environment is resumed from the resume file, if the resume file was identified as being in the resume stack.

23. A method for resuming a computing device, comprising:
determining whether a selected operational environment has an associated resume file;
identifying a location of the associated resume file, if available;
resuming the selected operational environment using the associated resume file, if available; and
booting the selected operational environment, if the associated resume file is not available, wherein the selected operational environment is chosen from a plurality of disparate operational environments capable of being executed on the computing device,
wherein each operational environment has a corresponding disk partition, the corresponding disk partition having an operational environment loader, wherein the resume file resides in a disk partition identified by a globally unique identifier (GUID) in a partition table, the disk partition corresponding to one of a plurality of operational environments to be run on the computing device, and wherein the computing device is configured with an extensible firmware interface (EFI) architecture to define the plurality of disk partitions having corresponding operational environments.

24. The method as recited in claim 23, further comprising:
entering a sleep mode for a current operational environment, wherein entering the sleep mode causes the saving of a corresponding resume file, the location of the corresponding resume file being made accessible to a resume selector; and selecting a second operational environment to which a resume is desired.

25. The method as recited in claim 23, wherein the resume selector uses pointers identifying locations of resume files of operational environments which have been put into sleep mode.

26. The method as recited in claim 25, wherein a bootnext variable identifies an operational environment to which to resume.

27. The method as recited in claim 26, wherein the bootnext variable identifies a location of a boot loader corresponding to the selected operational environment.

* * * * *

UNITED STATES PATENT AND TRADEMARK OFFICE
CERTIFICATE OF CORRECTION

PATENT NO. : 7,162,629 B2 Page 1 of 1
APPLICATION NO. : 10/719788
DATED : January 9, 2007
INVENTOR(S) : Zimmer et al.

It is certified that error appears in the above-identified patent and that said Letters Patent is hereby corrected as shown below:

Column 8, at line 25, delete "havina" and insert --having--.

Signed and Sealed this

Twenty-ninth Day of April, 2008

JON W. DUDAS
*Director of the United States Patent and Trademark Office*